United States Patent Office 3,517,473
Patented June 30, 1970

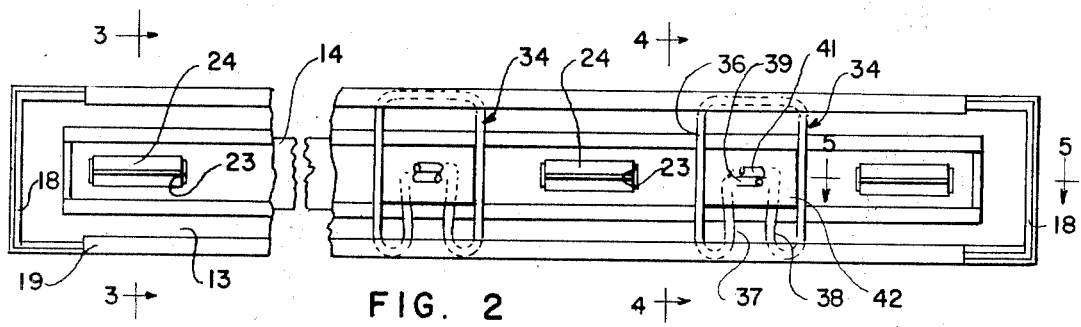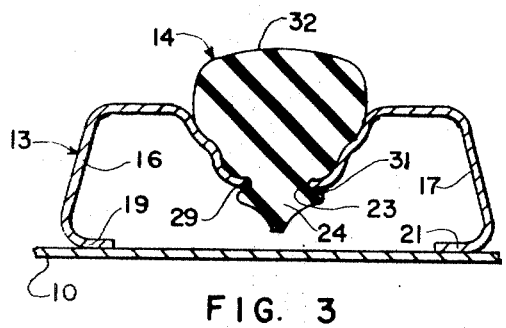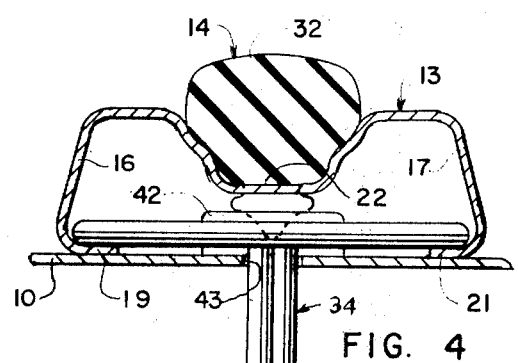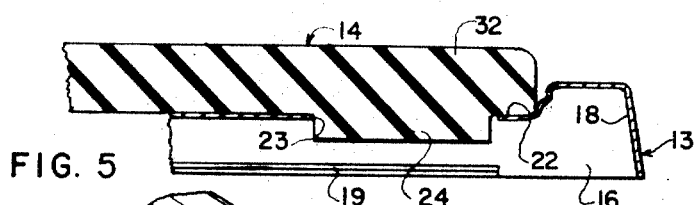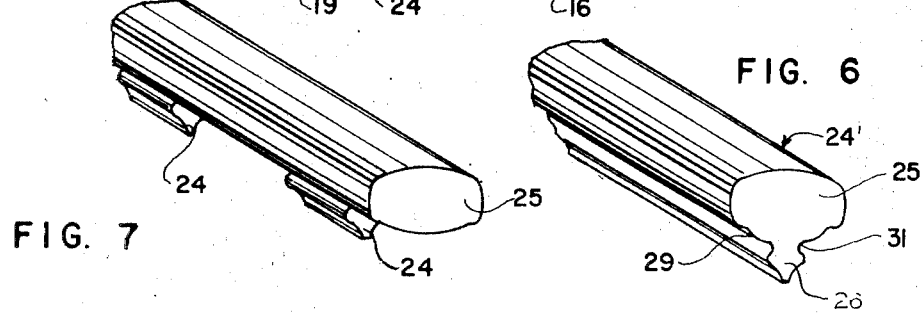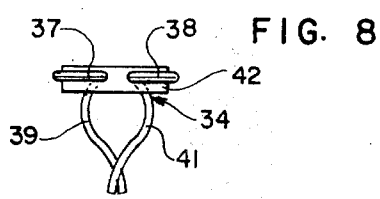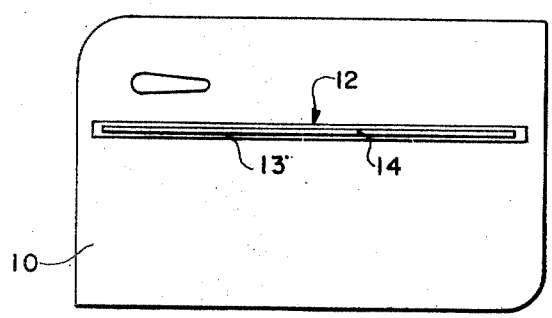
INVENTORS
THOMAS W. ANDERSON
CHARLES R. KISTNER

3,517,473
VEHICLE TRIM STRIP WITH ELASTOMERIC BUMPER INSERT
Charles R. Kistner, Pontiac, and Thomas W. Anderson, Troy, Mich., assignors to Textron, Inc., Providence, R.I., a corporation of Rhode Island
Filed Nov. 2, 1967, Ser. No. 680,125
Int. Cl. E04f *19/02;* B60r *13/04, 27/00*
U.S. Cl. 52—718                       2 Claims

ABSTRACT OF THE DISCLOSURE

A trim strip assembly including an elongated body with a lengthwise groove and an elongated resilient member in the groove having an exposed head, the resilient member being formed as an elongated extrusion, parts of the extrusion being cut away to form feet, which are anchored in slots along the groove.

---

This invention relates to a trim strip construction and to a method of forming the trim strip.

An object of this invention is to provide a trim strip which has a metal body and an exposed resilient insert mounted in the body so that the resilient insert is exposed to receive blows and to protect a panel upon which the trim strip is mounted.

A further object of this invention is to provide a method of forming a trim strip assembly having a metal body and a resilient exposed strip.

Briefly, this invention provides a trim strip having an elongated metal body provided with a lengthwise groove in which a resilient member is received. The resilient member is elongated and can be formed of rubber or rubber-like material having a continuous head and a plurality of feet which extend through openings in the metal body. The resilient member can be formed as an elongated extrusion with portions of the extrusion between feet being cut away during the forming process.

The above and other objects and features of the invention will be apparent to those skilled in the art to which this invention pertains from the following detailed description, and the drawings, in which:

FIG. 1 is a view in side elevational showing a door panel of a vehicle with a trim strip constructed in accordance with an embodiment of this invention mounted thereon;

FIG. 2 is a view in rear elevation of the trim strip removed from the vehicle, attaching clips being shown in association therewith;

FIG. 3 is a view in section taken on the line 3—3 in FIG. 2 on an enlarged scale, a fragmentary portion of a vehicle panel being shown in association with the trim strip;

FIG. 4 is a view in section taken on the line 4—4 in FIG. 2 on an enlarged scale, a portion of the vehicle panel being shown in association with the trim strip;

FIG. 5 is a view in section taken on the line 5—5 in FIG. 2 on an enlarged scale;

FIG. 6 is a perspective view of a fragmentary portion of an extrusion from which a resilient member of the trim strip is formed;

FIG. 7 is a fragmentary perspective view showing the resilient member of the trim strip after forming; and FIG. 8 is a view in side elevation of one of the attaching clips removed from the trim strip.

In the following detailed description, and the drawing, like reference characters indicate like parts.

In FIG. 1 is shown a vehicle panel 10 which can be a door panel of an automobile or the like. A trim strip 12 is mounted on the panel 10 at a position where other objects (not shown) can hit the door panel or where the door panel could hit such other objects. The trim strip includes a metal body 13 and a resilient strip 14. The body is shaped as shown in FIGS. 3, 4 and 5, with side walls 16 and 17 (FIGS. 3 and 4) end walls 18 (FIGS. 2 and 5) and inwardly turned flanges 19 and 21 (FIGS. 3 and 4) at lower edges of the side walls 16 and 17 respectively. A lengthwise groove 22 is formed in the body 13, the groove 22 terminating short of the end walls as indicated in FIG. 5. A plurality of slots 23 are formed in the body at the base of the groove for receiving feet 24, which are integral with the resilient strip 14.

The resilient strip 14 can be manufactured as an extrusion 24', as shown in FIG. 6, with a head portion 25 being integral with an extension 26. The extension 26 is separated from the head portion 25 by necked in sections 29 and 31 so that the extension is substantially triangular in cross section. Portions of the extrusion extension 26 are cut away, as shown in FIG. 7, to form the feet 24. The resilient strip 14 is mounted in the body 13 as shown in FIGS. 3 and 4 with the feet 24 extending through the slots 23 and edge portions of the slots being received in the neck portions 29 and 31 so that the extrusion is firmly anchored in the lengthwise groove 22 with outer ends of the walls 16 and 17 overlying the resilient strip but with an outer edge portion 32 of the resilient strip being outboard of the body and in position to ward off blows from the body 13 of the trim strip and from the panel 10. The body 13 is attached to the panel 10 by a plurality of clips 34 (FIGS. 2, 4 and 8). Each clip 34 includes a generally U-shaped body 36, inwardly directed arms 37 and 38, and legs 39 and 41, all being formed of a single length of spring wire. A resilient pad 42 of rubber or the like is mounted on the arms 37 and 38. The legs 39 and 41 are adapted to extend through an opening 43 (FIG. 4) in the panel 10 to resiliently hold the trim strip in position engaging the panel 10 with the resilient pad 42 overlying the opening 43 to close the opening and to protect paint or the like on the face of the panel 10.

The trim strip and method of making same illustrated in the drawing and described above are subject to structural modification without departing from the spirit and scope of the appended claims.

Having described my invention, what I claim is new and desire to protect by Letters Patent is:

1. A trim strip assembly comprising an elongated body, there being a plurality of slots spaced along the body, an elongated insert strip of resilient material having a plurality of spaced feet thereon, the feet extending through the slots to attach he insert strip to the body with a head portion of the insert strip exposed outboard of the body, and means for attaching the body to a face of a panel with the exposed head in position to ward off blows from the panel, the means for attaching the body to the face of the panel including a pair of spaced inwardly directed flanges on the body and fasteners mounted on the panel with portions of the fasteners overlying the flanges, the fasteners being slidable along the body.

2. A trim strip assembly as in claim 1 wherein the body has an elongated groove therein, the slots being in the groove, and the head portion is received in the groove with an outer section of the head portion exposed.

References Cited

UNITED STATES PATENTS

| | | | |
|---|---|---|---|
| 1,936,112 | 11/1933 | Jelliffe | 248—188.8 |
| 2,967,324 | 1/1961 | Gagnier | 16—86 |
| 3,290,082 | 12/1966 | Fritsche | 293—1 |
| 3,359,030 | 12/1967 | Newman | 293—1 |
| 3,388,523 | 6/1968 | Evans | 52—717 |

FOREIGN PATENTS 1,039,729   5/1953   France.

ARTHUR L. LA POINT, Primary Examiner

H. BELTRAN, Assistant Examiner

U.S. Cl. X.R.

16—86; 248—188.8; 293—1, 62